United States Patent
Shiraishi et al.

(10) Patent No.: US 6,956,724 B2
(45) Date of Patent: Oct. 18, 2005

(54) PRECISE POSITIONING ACTUATOR FOR HEAD ELEMENT, HEAD GIMBAL ASSEMBLY WITH THE ACTUATOR, DISK DRIVE APPARATUS WITH THE HEAD GIMBAL ASSEMBLY AND MANUFACTURING METHOD OF HEAD GIMBAL ASSEMBLY

(75) Inventors: Masashi Shiraishi, Tokyo (JP); Tamon Kasajima, Tokyo (JP)

(73) Assignee: TDK Corporation, Tokyo (JP)

( * ) Notice: Subject to any disclaimer, the term of this patent is extended or adjusted under 35 U.S.C. 154(b) by 40 days.

(21) Appl. No.: 10/705,885

(22) Filed: Nov. 13, 2003

(65) Prior Publication Data

US 2004/0095688 A1 May 20, 2004

Related U.S. Application Data

(62) Division of application No. 09/933,774, filed on Aug. 22, 2001, now Pat. No. 6,690,551.

(30) Foreign Application Priority Data

Aug. 24, 2000 (JP) ........................................ 2000-253930

(51) Int. Cl.$^7$ .............................................. G11B 5/596
(52) U.S. Cl. .................................................. 360/294.4
(58) Field of Search ........................... 360/294.4, 294.6

(56) References Cited

U.S. PATENT DOCUMENTS

| | | | |
|---|---|---|---|
| 5,612,841 A | 3/1997 | Johnson | |
| 5,745,319 A | 4/1998 | Takekado et al. ........ | 360/78.05 |
| 5,864,448 A | 1/1999 | Berberich | |
| 6,078,473 A | 6/2000 | Crane et al. | |
| 6,198,606 B1 * | 3/2001 | Boutaghou et al. ...... | 360/294.3 |
| 6,351,354 B1 | 2/2002 | Bonin | |
| 6,590,747 B1 * | 7/2003 | Boutaghou et al. ...... | 360/294.3 |
| 6,751,069 B2 * | 6/2004 | Yao et al. ................ | 360/294.4 |

FOREIGN PATENT DOCUMENTS

| | | |
|---|---|---|
| JP | 6-309822 | 11/1994 |
| JP | 8-180623 | 7/1996 |
| JP | 2000-113615 | 4/2000 |
| WO | 98/19304 | 5/1998 |
| WO | 00/16318 | 3/2000 |

* cited by examiner

*Primary Examiner*—Robert S. Tupper
(74) *Attorney, Agent, or Firm*—Armstrong, Kratz, Quintos, Hanson & Brooks, LLP

(57) ABSTRACT

A precise positioning actuator to be fixed with a head slider with at least one head element and with a support, for precisely positioning the at least one head element, including a pair of movable arms capable of displacing in response to a drive signal applied to the actuator The head slider is caught in a space between the movable arms.

24 Claims, 13 Drawing Sheets

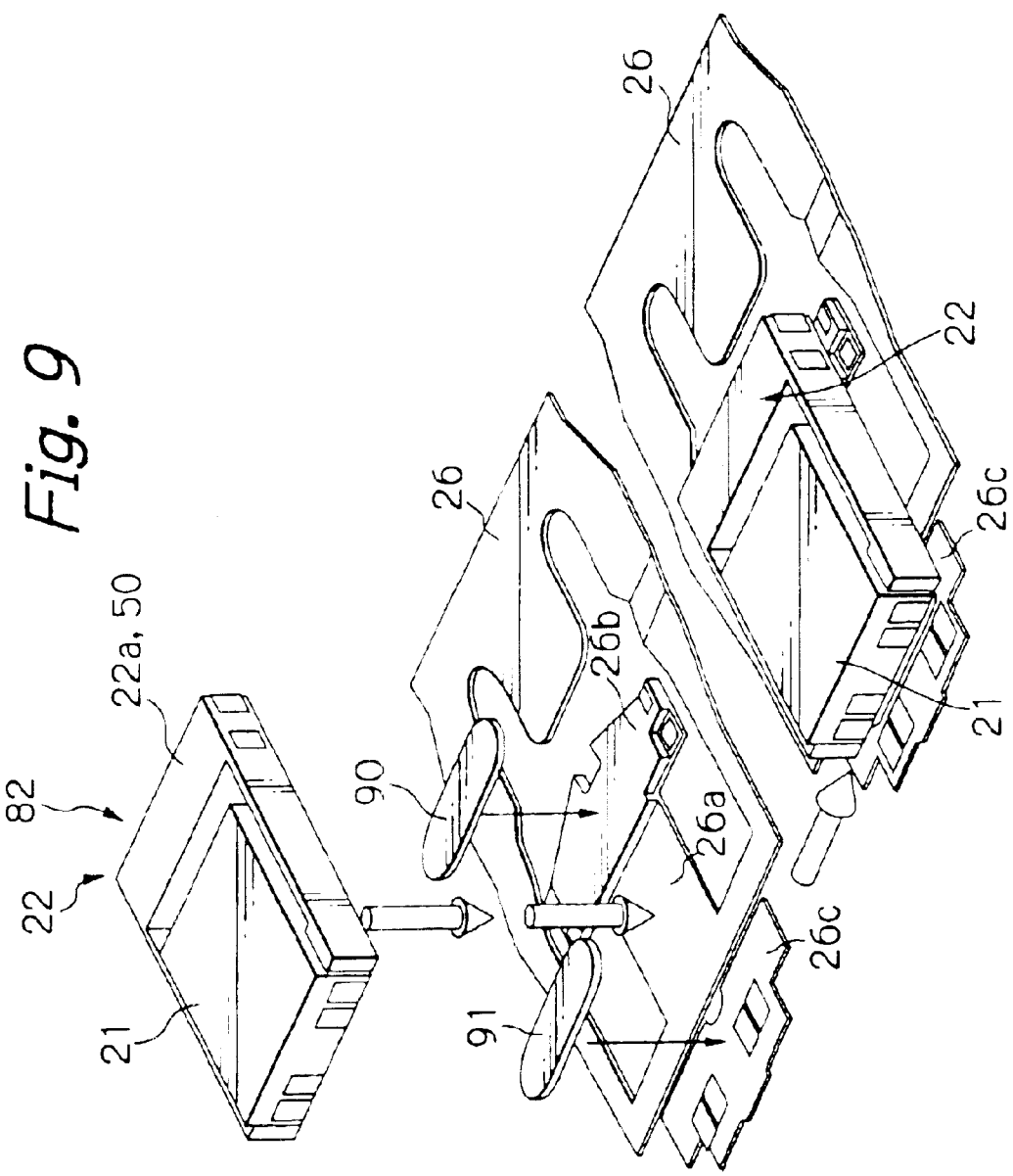

PRECISE POSITIONING ACTUATOR FOR HEAD ELEMENT, HEAD GIMBAL ASSEMBLY WITH THE ACTUATOR, DISK DRIVE APPARATUS WITH THE HEAD GIMBAL ASSEMBLY AND MANUFACTURING METHOD OF HEAD GIMBAL ASSEMBLY

This application is a divisional application of prior U.S. Ser. No. 09/933,774, filed on Aug. 22, 2001, now U.S. Pat. No. 6,690,557.

FIELD OF THE INVENTION

The present invention relates to a precise positioning actuator for a head element such as a thin-film magnetic head element or an optical head element, to a head gimbal assembly (HGA), with the actuator, to a disk drive apparatus with the HGA and to a manufacturing method of an HGA.

DESCRIPTION OF THE RELATED ART

In a magnetic disk drive apparatus, thin-film magnetic head elements for writing magnetic information into and/or reading magnetic information frag magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) has rapidly increased in order to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

Inventors of this application have been proposed a piggy-back structure actuator. This piggy-back structure actuator is formed by piezoelectric material of PZT in an I-character shape with one end section to be fixed to a suspension, the other end section to be fixed to a magnetic head slider and a pillar shaped movable arm connected between these end sections. On the suspension, stepwise stacked are the actuator and the magnetic head slider, namely, the actuator is caught between the suspension and the slider to form a stacked cantilever structure.

However, an HGA with such piggy-back structure actuator will have following various problems:

(1) Because of the stepwise stacked structure, a total thickness of the HGA around the magnetic head slider increases by the thickness of the actuator;
(2) The actuator as a whole consists of piezoelectric material such as PZT of a brittle material, and the actuator and the magnetic head slider are stacked to form a cantilever structure. A shock easily occurs with a moment and also shock resistance is very poor;
(3) Depending upon the size of the magnetic head slider, a travel of the magnetic head element during the precise positioning operation varies. Thus, it is difficult to obtain enough stroke;
(4) Because of three-dimensional and complicated attachment structure of the actuator, the handling at the time of an assembly of the HGA is very difficult and it is impossible to use a conventional HGA assembly equipment causing productivity to be very worse; and
(5) In order not to interfere with the movement of the actuator, it is necessary to assemble with keeping a gap between the actuator and the magnetic head slider and also between the actuator and the suspension. However, forming of such gap will more decree the shock resistance and it is difficult to precisely keep the gap constant. Particularly, since it is difficult to keep the suspension, the actuator and the magnetic head slider in parallel precisely, the head characteristics deteriorates.

SUMMARY OF THE INVENTION

It is therefore an object of the present invention to provide a precise positioning actuator for a head element, an HGA with the actuator, a disk drive apparatus with the HGA and a manufacturing method of an HGA, whereby a thickness of the HGA will not increase even if the actuator is mounted thereto.

Another object of the present invention is to provide a precise positioning actuator for a head element, an HGA with the actuator, a disk drive apparatus with the HGA and a manufacturing method of an HGA, whereby a shock resistance can be greatly improved.

A further object of the present invention is to provide a precise positioning actuator for a head element, an HGA with the actuator, a disk drive apparatus with the HGA and a manufacturing method of an HGA, whereby the productivity and also quality of the HGA can be greatly improved.

According to the present invention, a precise positioning actuator to be fixed with a head slider with at least one head element and with a support, for precisely positioning the at least one head element, includes a pair of movable arms capable of displacing in response to a drive signal applied to the actuator The head slider is caught in a space between the movable arms.

Since the head slider is caught in a space between the movable arms capable of displacing in response to a drive signal applied thereto, the thickness of an HGA around the head slider does not increase even if the actuator is attached. Thus, no modifications in size of a disk drive apparatus due to the mounting of the actuator is necessary. Also, since the actuator and the head slider are not stacked to form a cantilever structure, a shock resistance can be greatly improved. Furthermore, since the head slider is caught in between the movable arms, the top end sections of the movable arms, which actually transfer the displacement to the head slider, can be always positioned at the top end of the head slider. Thus, it is possible to provide a constant travel to the head slider even if its size changes, and therefore an enough stroke of the head element at the precise positioning operation can be always obtained.

It is preferred that the actuator further includes a base fixed to the support and that the movable arms extend from the base.

It is also preferred that the movable arms have at their top end sections slider fixing sections to be fixed to side surfaces of the head slider, respectively. In this case, preferably, the actuator has a shape so that there exists air gaps between the movable arms and side surfaces of the head slider except for the slider fixing sections, respectively.

It is also preferred that the base is made of an elastic sintered ceramic. Furthermore, it is preferred that each of the movable arms includes an aim member made of an elastic sintered ceramic, and a piezoelectric element formed on a side surface of the arm member. Since the main sections of the actuator are made of elastic sintered ceramic such as $ZrO_2$ that is strong for bending, a shock resistance of the actuator itself increases.

It is preferred that the movable arms is constituted so that the head slider is linearly and laterally oscillated in response to the drive signal. Since the head slider displaces namely oscillates with linear motion not swinging or rotational motion, more precise positioning of the head element can be expected.

It is also preferred that inner corners at coupling sections of the base and the movable arms have an obtuse angle plane shape or a smooth plane shape. Thus, the shock resistance of the actuator itself is extremely improved.

It is preferred that the actuator has a rough U-plane shape.

It is also preferred that the actuator has a thickness equal to or less than a thickness of a head slider to be caught.

It is preferred that a spacing between the pair of movable arms is determined to a value slightly shorter than a width of the head slider to be caught.

It is preferred that the at least one head element is at least one thin-film magnetic head element.

According to the present invention, an HGA includes a head slider with at least one head element, a support and the aforementioned precise positioning actuator fixed with the head slider and with the support for precisely positioning the at least one head element.

It is preferred that the movable arms of the actuator and the head slider are fixed with an adhesive.

It is also preferred that the actuator and the support are fixed with an adhesive or a solder.

According to the present invention, a disk drive apparatus having at least one HGA mentioned above.

Also, according to the present invention, a manufacturing method of an HGA includes a step of preparing a precise positioning actuator with a pair of movable arms capable of displacing in response to a drive signal applied thereto, a step of catching a head slider with at least one head element in a space between the movable arms of the actuator, and a step of fixing the actuator with the caught head slider to the support.

First, the head slider is caught in a space between the movable arms of the actuator, and then the actuator with the caught head slider is fixed to the support. Since assembling of the head slider and the actuator can be carried out on the flat plate, alignment of the slider and the actuator become easy resulting that a higher accuracy assembling can be expected. Also, since a thermosetting adhesive with excellent curing performance although it needs a long curing time can be used, a high quality assembly of the head slider and the actuator can be obtained. Furthermore, since the assembly has a simple shape, adhesion and electrical connection of the assembly with a suspension can be performed by using a general HGA assembling equipment resulting the productivity to extremely improve and thus the manufacturing cost to reduce.

It is preferred that the catching step includes fixing the head slider between the movable arms with an adhesive.

It is also preferred that a spacing between the pair of movable arms is slightly shorter than a width of the head slider to be caught, and that the catching step includes provisionally fixing the head slider between the movable arms by a pinching force of the movable arms. The provisional fixing can be attained without using any holder.

It is preferred that the catching step includes securely fixing the head slider to the movable arms by thermally curing the adhesive after the provisional fixing.

It is also preferred that the fixing step includes fixing the actuator to the support with an adhesive or a solder Further objects and advantages of the present invention will be apparent from the following description of the preferred embodiments of the invention as illustrated in the accompanying drawings.

BRIEF DESCRIPTION OF THE DRAWINGS

FIG. 9 is an oblique view illustrating a part of a manufacturing process of the HGA in the embodiment of FIG. 1;

DESCRIPTION OF THE PREFERRED EMBODIMENTS

Figure 1:
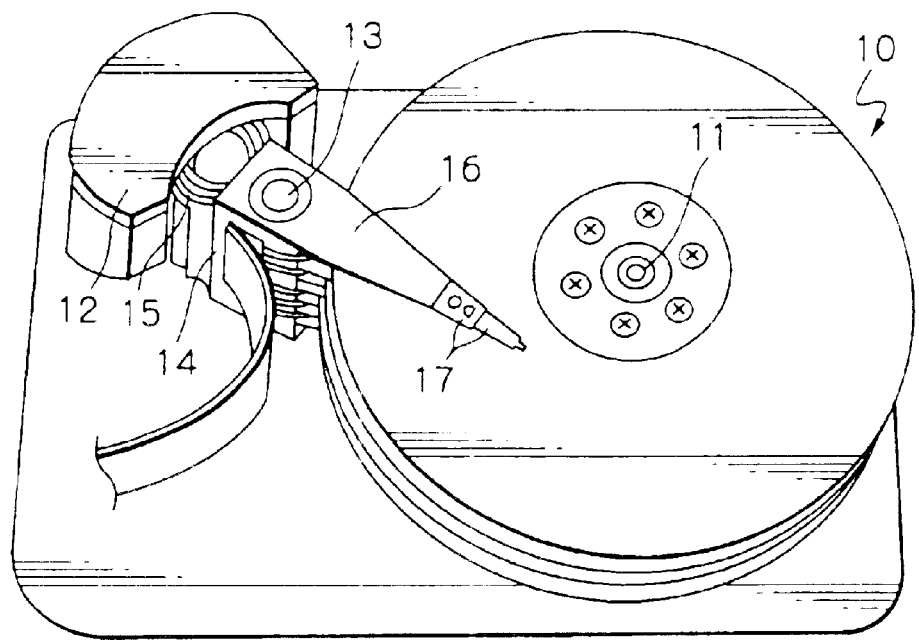
FIG. 1 is an oblique view schematically illustrating main components of a magnetic disk drive apparatus in a preferred embodiment according to the present invention.
Figure 2:
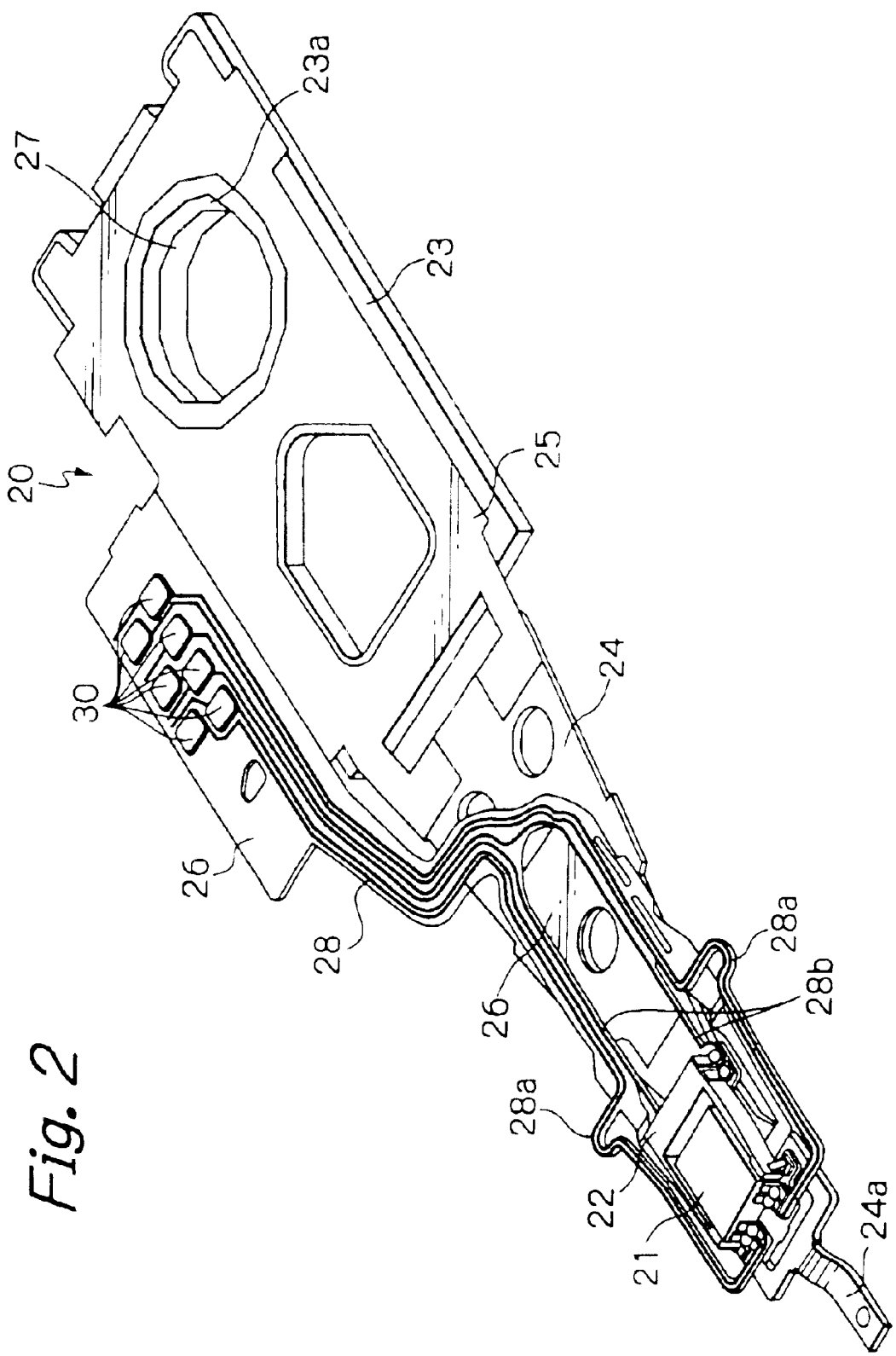
FIG. 2 is an oblique view illustrating the whole structure of an HGA in the t of FIG. 1.
Figure 3:
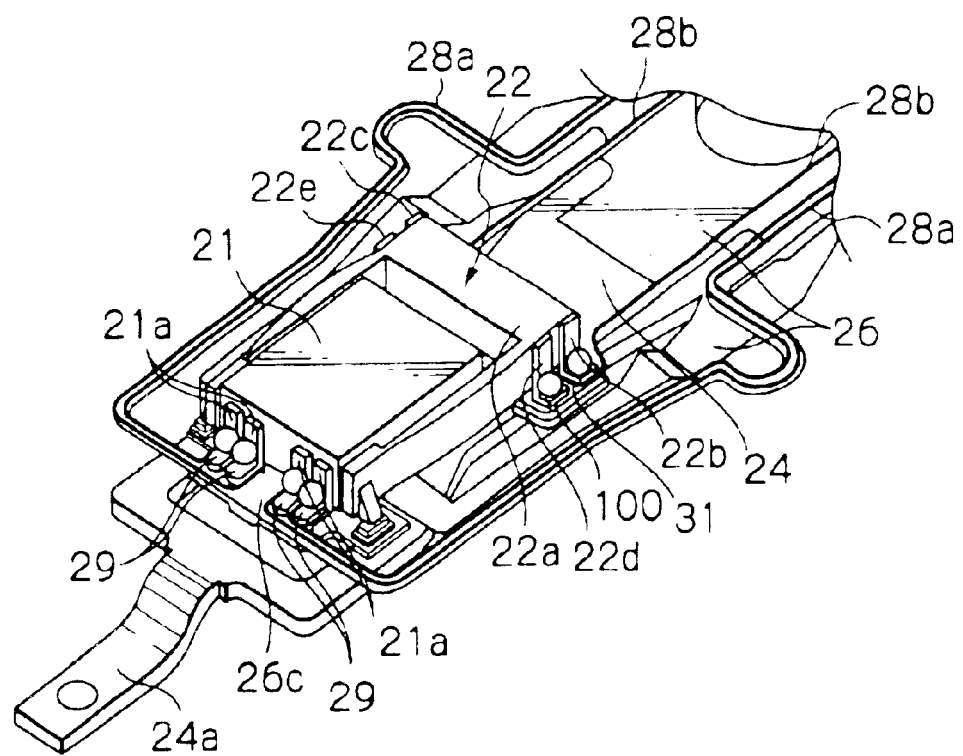
FIG. 3 is an oblique view illustrating a top end section of the HGA in the t of FIG. 1.
Figure 4:
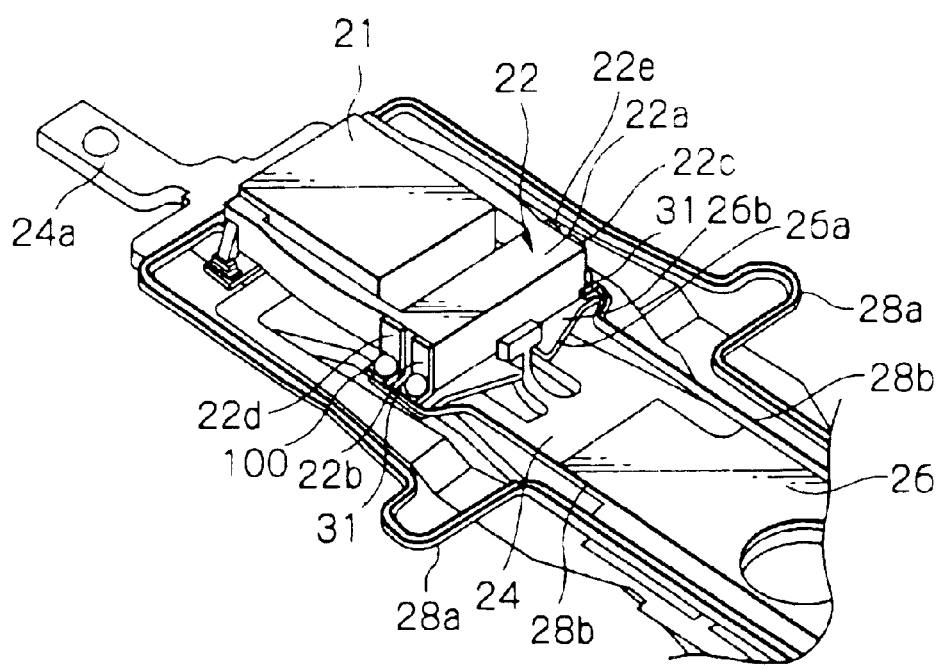
FIG. 4 is an oblique view illustrating the top end section of the HGA in the embodiment of FIG. 1, seen from different direction from that of FIG. 3.

FIG. 1 illustrates main components of a magnetic disk unit of a preferred embodiment according to the present invention, FIG. 2 illustrates the whole structure of an HGA in this embodiment, and FIGS. 3 and 4 illustrate a top end section of the HGA in this embodiment, seen from different directions with each other.

In FIG. 1, reference numeral 10 denotes a plurality of magnetic hard disks rotating around an axis 11, and 12 denotes an assembly carriage device for positioning each magnetic head element on a track of each disk. The assembly carriage device 12 is mainly constituted by a carriage 14 capable of rotating around an axis 13 and a main actuator 15 such as for example a voice coil motor (VCM) for driving the carriage 14 to rotate.

Base sections at one ends of a plurality of drive arms 16 stacked along the axis 13 are attached to the carriage 14, and one or two HGAs 17 are mounted on a top section at the other end of each arm 16. Each of the HGAs 17 has a slider mounted at its top end section so that the slider opposes to one surface (recording and reproducing surface) of each of the magnetic disks 10.

As shown in FIGS. 2 to 4, the HGA is assembled by fixing a fine tracking actuator 22 for precise positioning of a thin-film magnetic head element to a top end section of a suspension 20. The actuator 22 holds side surfaces of a magnetic head slider 21 with the thin-film magnetic head element so that the slider 21 is caught in a space between its movable arms.

A main or course actuator of VCM 15 shown in FIG. 1 is used for rotationally moving the drive arm 16 to which such HGA is attached, so as to move the whole assembly. The actuator 22 contributes the fine positioning of the HGA, which cannot be adjusted by the main or course actuator 15.

The suspension 20 is substantially formed, as shown in FIGS. 2 to 4, by first and second load beams 23 and 24, a resilient hinge 25 coupled with both these first and second load beams 23 and 24, a resilient flexure 26 fixed on the second load beam 24 and the hinge 25, and a circular base plate 27 fonder at an attaching section 23a of the first load beam 23.

The flexure 26 has a flexible tongue 26a depressed by a dimple (not shown) formed on the second load beam 24 at its one end section. On the tongue 26a, fixed is a base section 22a of the actuator 22 via an insulation layer 26b made of for example polyimide.

The flexure 26 has elasticity for supporting flexibly the magnetic head slider 21 through the actuator 22 by this tongue 26a. The flexure 26 is made of in this embodiment a stainless steel plate (for example SUS304TA) with a thickness of about 20 $\mu$m. The flexure 26 is fixed with the second load beam 24 and with the hinge 25 at a plurality of points by pinpoint welding.

The hinge 25 has elasticity providing, to the second load beam 24, a force for pressing the magnetic head slider 21 toward the direction of a magnetic disk surface through the actuator 22 in operation. The hinge 25 is made of in this embodiment a stainless steel plate with a thickness of about 40 $\mu$m.

The first load beam 23 is made of in this embodiment a stainless steel plate with a thickness of about 100 $\mu$m, and supports the whole surface of the hinge 25. The fixing of the first load bean 23 with the hinge 25 is performed by pinpoint welding at a plurality of points.

The second load beam 24 is also made of in this embodiment a stainless steel plate with a thickness of about 100 $\mu$m, and fixed to the hinge 25 at its rear end section. The fixing of the second load beam 24 with the hinge 25 is performed also by pinpoint welding at a plurality of points. At a top end of this second load beam 24, formed is a lift-tab 24a for separating the HGA from the magnetic-disk surface during out of operation is prepared.

The base plate 27 to be attached to the drive arm 16 shown in FIG. 1 is made of in this embodiment a stainless steel or iron plate with a thickness of about 150 $\mu$m. This base plate 27 is fixed to the attaching section 23a of the first load beam 23 by welding.

On the flexure 26, a flexible conductor member 28 including a plurality of trace conductors of a thin-film multi-layered pattern is formed or disposed. The conductor member 28 is formed by a known method similar to the patterning method of forming a printed circuit board on a thin metal plate such as a flexible printed circuit (FPC). For example, the member 28 is formed by sequentially depositing a first insulation material layer made of a resin such as polyimide with a thickness of about 5 $\mu$m, a patterned Cu layer (trace conductor layer) with a thickness of about 4 $\mu$m, and a second insulation material layer made of a resin such as polyimide with a thickness of about 5 $\mu$m on the flexure 26 in this order. Within the regions of the connection pads formed for connecting with the actuator, the magnetic head element and an external circuit, an Au layer is deposited on the Cu layer and there is no second insulation material layer on the Au layer.

In this embodiment, the conductor member 28 consists of a first conductor member 28a with two trace conductors connected to the magnetic head element for one side, thus four trace conductors for both sides, and a second conductor member 28b with a trace conductor connected to the actuator 22 for one side, thus two trace conductors for both sides.

One end of the trace conductors of the first conductor member 28a is electrically connected to head element connection pads 29 formed on an individually separated and freely movable section 26c of the flexure 26. The connection pads 29 are ball-bonded to terminal electrodes 21a of the magnetic head slider 21 by Au bonding, wire bonding or stitch bonding. The other end of the trace conductors of the first conductor 28a is electrically connected to external circuit connection pads 30 used for connection with an external circuit.

One end of trace conductors of the second conductor member 28b is electrically connected to actuator connection pads 31 formed on an insulation layer 26b on the tongue 26a of the flexure 26. The connection pads 31 are connected to A channel and B channel signal terminals 22b and 22c of the actuator 22, respectively. The other end of trace conductors of the second conductor member 28b is electrically connected to the external circuit connection pads 30.

A structure of the HGA according to the present invention is not limited to the aforementioned structure. Furthermore, although it is not shown, a head drive IC chip may be mounted on a middle of the suspension 20.

Figure 5:
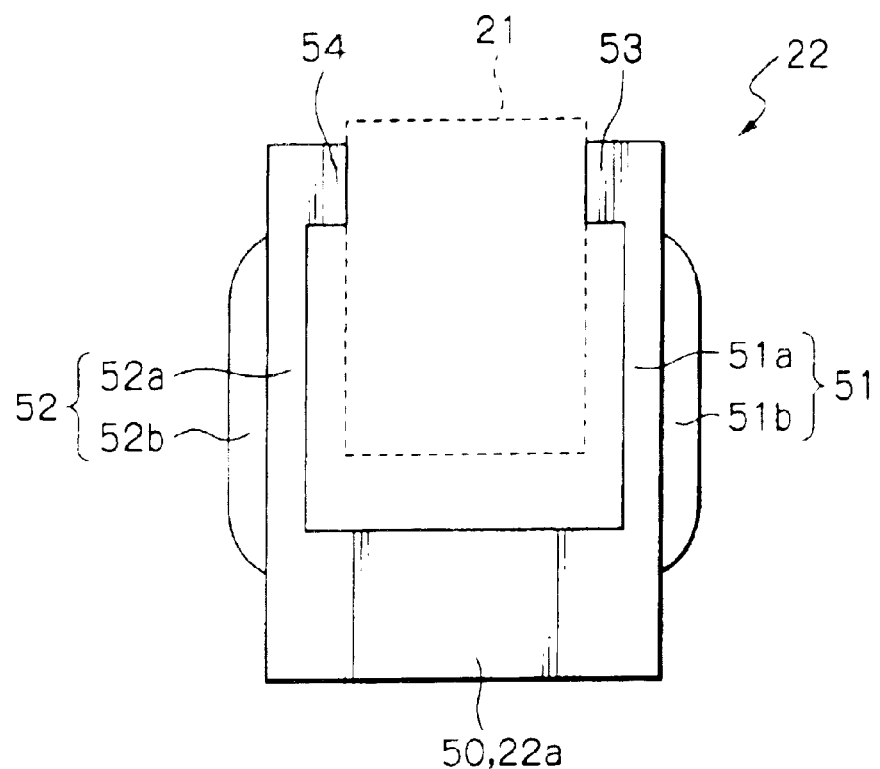
FIG. 5 is a plane view illustrating a structure of an actuator in the embodiment of FIG. 1.
Figure 6:
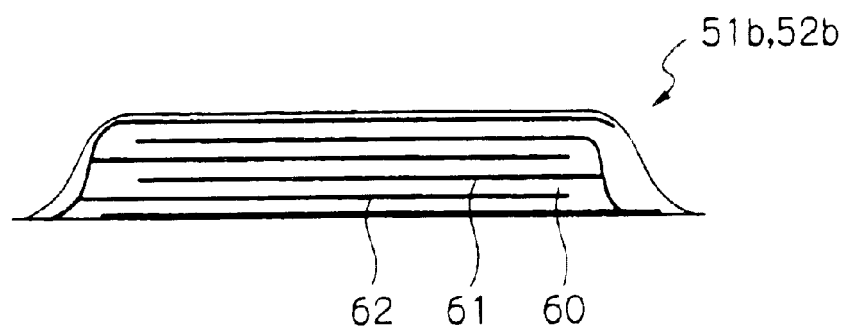
FIG. 6 is a sectional view illustrating a structure of a piezoelectric element section of the actuator shown in FIG. 5.
Figure 7:
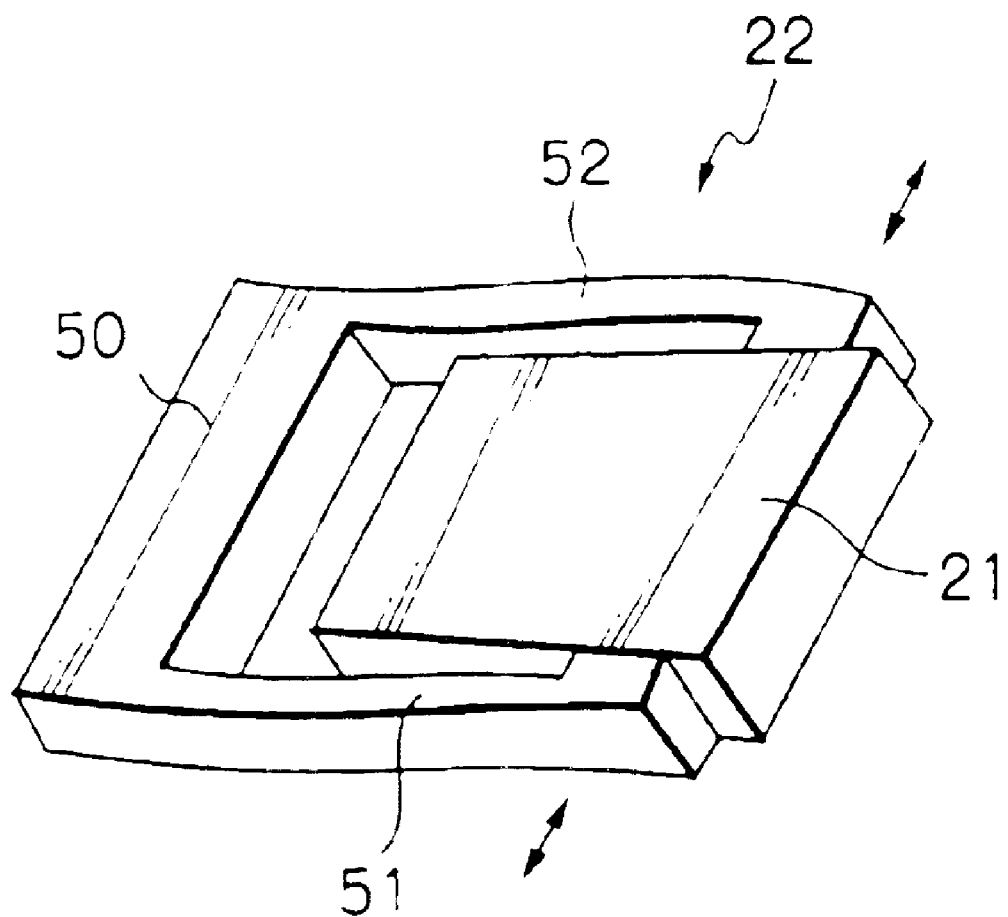
FIG. 7 is an oblique view illustrating an operation of the actuator shown in FIG. 5.

FIG. 5 illustrates a structure of the actuator 22 in the embodiment of FIG. 1, FIG. 6 illustrates a structure of a piezoelectric element section of the actuator 22 and FIG. 7 illustrates moving operation of this actuator 22.

As will be noted from FIG. 5, the actuator 22 has a rough U-plane shape and consists of a base 50 (22a) to be fixed to a suspension and a pair of movable arms 51 and 52 perpendicularly extending from both side ends of the base 50. At top end sections of the movable arms 51 and 52, formed selectively are slider fixing sections 53 and 54 to be fixed to side surfaces of the magnetic head slider 21 so that the slider 21 is caught in a space between the slider fixing sections 53 and 54. The spacing between the slider fixing sections 53 and 54 is determined to a value slightly shorter than the width of the magnetic head slider to be caught therein. A thickness of the actuator 22 is determined to a value equal to or thinner than that of the magnetic head slider to be held so that the total thickness of the HGA will not increase due to the mounting of the actuator. Conversely, by thickening the actuator 22 up to the thickness of the magnetic head slider to be held, strength of the actuator itself can be increased without increasing the total thickness of the HGA.

The slider fixing sections 53 and 54 are projected inwardly, namely toward the magnetic head slider 21, so that only these sections 53 and 54 are attached to the side surfaces of the magnetic head slider 21 and that there exists air gaps between the remaining sections of the movable arms 51 and 52 and the side surfaces of the magnetic head slider 21.

The movable arms 51 and 52 consist of arm members 51*a* and 52*a* and piezoelectric elements 51*b* and 52*b* formed on side surfaces of the arm members 51*a* and 52*a*, respectively.

The base 50 and the arm members 51*a* and 52*a* of the actuator 22 are united by an elastic sintered ceramic such as $ZrO_2$ for example. Since the main sections of the actuator are made of the elastic sintered ceramic such as $ZrO_2$ that is strong for bending, a shock resistance of the actuator itself increases.

Each of the piezoelectric elements 51*b* and 52*b* has, as shown in FIG. 6, a multi-layered structure of alternately laminating piezoelectric material layers 60, signal electrode layers 61 and ground (common) electrode layers 62. By applying voltage across the signal electrode layers 61 and the ground (common) layers 62, the piezoelectric material layers 60 expand and contract. The piezoelectric material layer 60 is made of material that expands and contracts by reverse piezoelectric effect or by electrostrictive effect. The signal electrode layers 61 are electrically connected to the A channel signal terminal 22*b* or the B channel signal terminal 22*c*, and the ground (common) electrode layers 62 are electrically connected to ground (common) terminal 22*d* or 22*e*, shown in FIGS. 3 and 4.

In case that the layers 60 are made of piezoelectric material such as PZT (Lead Zirconate Titanate Oxidization), these piezoelectric material layers are in general polarized so as to improve their displacement performance. The polarized direction is the lamination direction of the piezoelectric material layers 60. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element 51*b* or 52*b*, the piezoelectric element contracts or expands in response to the applied voltage polarity and thus the movable arm 51 or 52 bends to trace a S-character as shown in FIG. 7 resulting the top end section of the arm 51 or 52 to laterally and linearly displace. Thus, the magnetic head slider 21 fixed with the actuator 22 also laterally and linearly displaces. Since the slider displaces namely oscillates with linear motion not swinging or rotational motion, more precise positioning of the magnetic head element can be expected.

It is possible to apply voltages that induce mutually reverse motions may be simultaneously applied to the piezoelectric elements 51*b* and 52*b*, respectively. In other words, AC voltages may be simultaneously applied to the piezoelectric elements 51*b* and 52*b* so that one piezoelectric element expands when the other piezoelectric element contracts and vice versa. The oscillation of the movable arms is centered when no voltage is applied to the piezoelectric elements.

However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as $PZT[Pb(Zr,Ti)O_3]$, $PT(PbTiO_3)$, $PLZT[(Pb,La)(Zr,Ti)O_3]$, or barium titanate $(BaTiO_3)$.

As aforementioned, since the actuator 22 in this embodiment holds the side surfaces of the magnetic head slider 21 so that the slider 21 is caught in a space between the movable arms 51 and 52, the thickness of the HGA around the magnetic head slider does not increase even if the actuator 22 is attached. Thus, no modifications in size of the magnetic disk drive apparatus due to the mounting of the actuator is necessary. Also, since the actuator 22 and the magnetic head slider 21 are not stacked to form a cantilever structure, a shock resistance can be greatly improved. Furthermore, since the magnetic head slider 21 is caught in between the movable arms 51 and 52, the top end sections of the movable arms 51 and 52, which actually transfer the displacement to the slider 21, can be always positioned at the top end of the slider 21. Thus, it is possible to provide a constant travel to the slider even if the size of the magnetic head slider 21 changes, and therefore an enough stroke of the magnetic head at the precise positioning operation can be always obtained.

FIGS. 8, 9 10*a* and 10*b* illustrate parts of a manufacturing process of the HGA in this embodiment.

First, a magnetic head slider 21 and an actuator 22 are prepared. The magnetic head slider 21 is fabricated by a known manufacturing method. The actuator 22 may be fabricated for example by forming rectangular tube with a U-section as shown in FIG. 5, namely with three side faces and one entirely opened side face, made of a sintered ceramic such as for example $ZrO_2$, by forming or printing continuous piezoelectric elements with the section shown in FIG. 6 on the both side faces of the tube, by cutting the tube perpendicularly to its axis with a predetermined interval to separate into individual actuator frames, and by forming terminal electrodes on each separated actuator frame.

Figure 8:
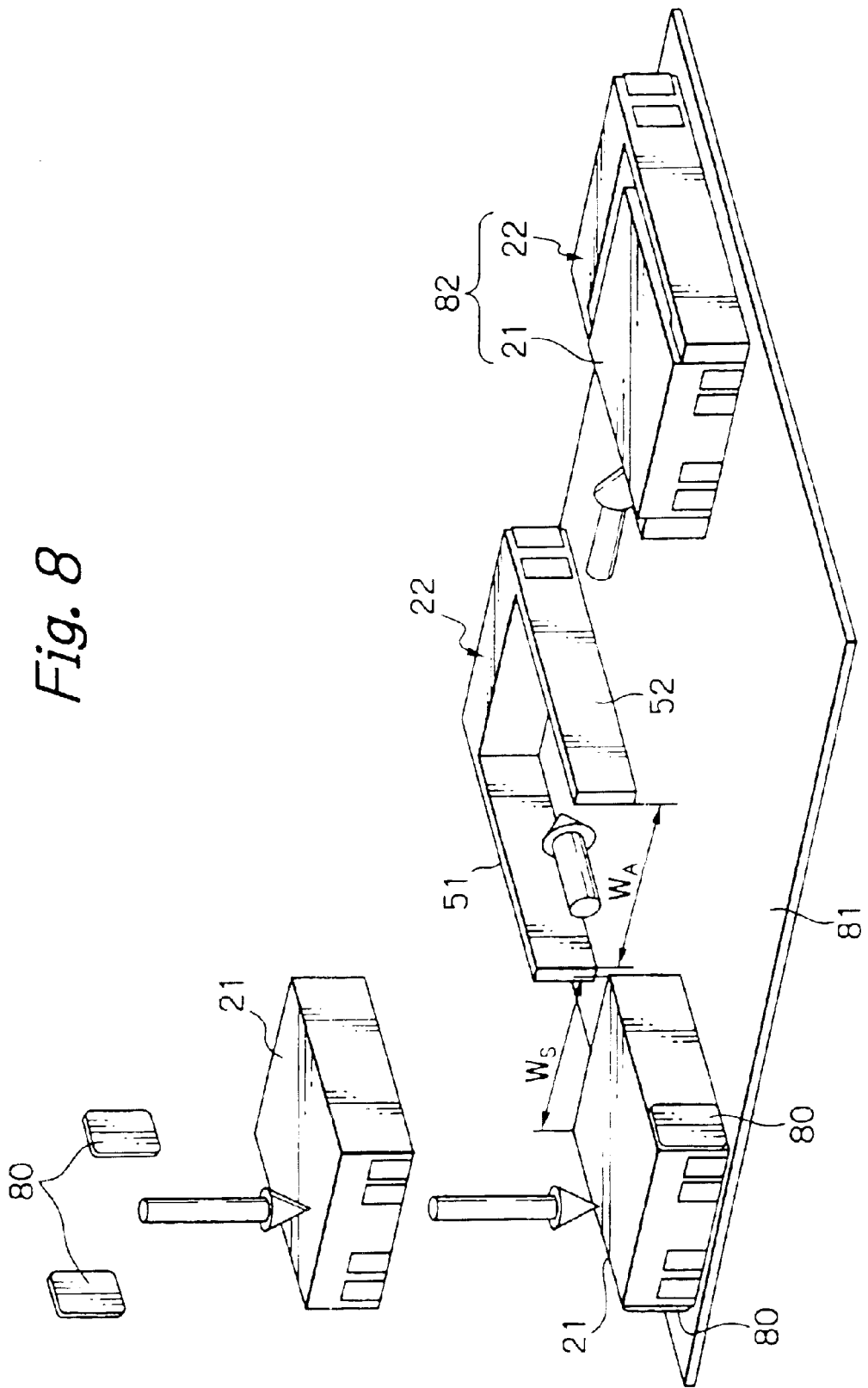
FIG. 8 is an oblique view illustrating a part of a manufacturing process of the HGA in the embodiment of FIG. 1.

Then, as shown in FIG. 8, the magnetic head slider 21 and the actuator 22 are assembled. First, an adhesive 80 such as a thermosetting epoxy resin family adhesive is coated on parts of both side surfaces of the magnetic head slider 21. Then, the slider 21 is disposed on a flat plate 81 and inserted between the movable arms 51 and 52 of the actuator 22 that is also disposed on the flat plate 81.

The spacing $W_A$ between the movable arms 51 and 52 of the actuator 22 is set a little smaller than the width $W_S$ of the magnetic head slider 21. Thus, the magnetic head slider 21 can be provisionally fixed between the movable arms 51 and 52 by a pinching force of these arms without using any holder. Then, by thermally curing the adhesive 80, the slider 21 is securely fixed to the movable arms 51 and 52.

An assembly 82 of the magnetic head slider 21 and the actuator 22 is thus formed.

Since assembling of the magnetic head slider 21 and the actuator 22 can be carried out on the flat plate, alignment of the slider and the actuator becomes easy resulting that a higher accuracy assembling can be expected. Also, since a thermosetting adhesive with excellent curing performance although it needs a long curing time can be used, a high quality assembly 82 of the magnetic head slider 21 and the actuator 22 can be obtained.

Then, as shown in FIG. 9, the assembly 82 of the magnetic head slider 21 and the actuator 22 is fixed on the flexure 26 of the suspension 20. More concretely, adhesive 90 and 91 are coated on the insulation layer 26b on the tongue 26a of the flexure 26 and on the separated section 26c of the flexure 26, respectively, and the base 22a (50) of the actuator 22 of the assembly 82 and the top end section of the magnetic head slider 21 of the assembly 82 are adhered on the insulation layer 26b and on the separated section 26c, respectively.

Figure 10A:
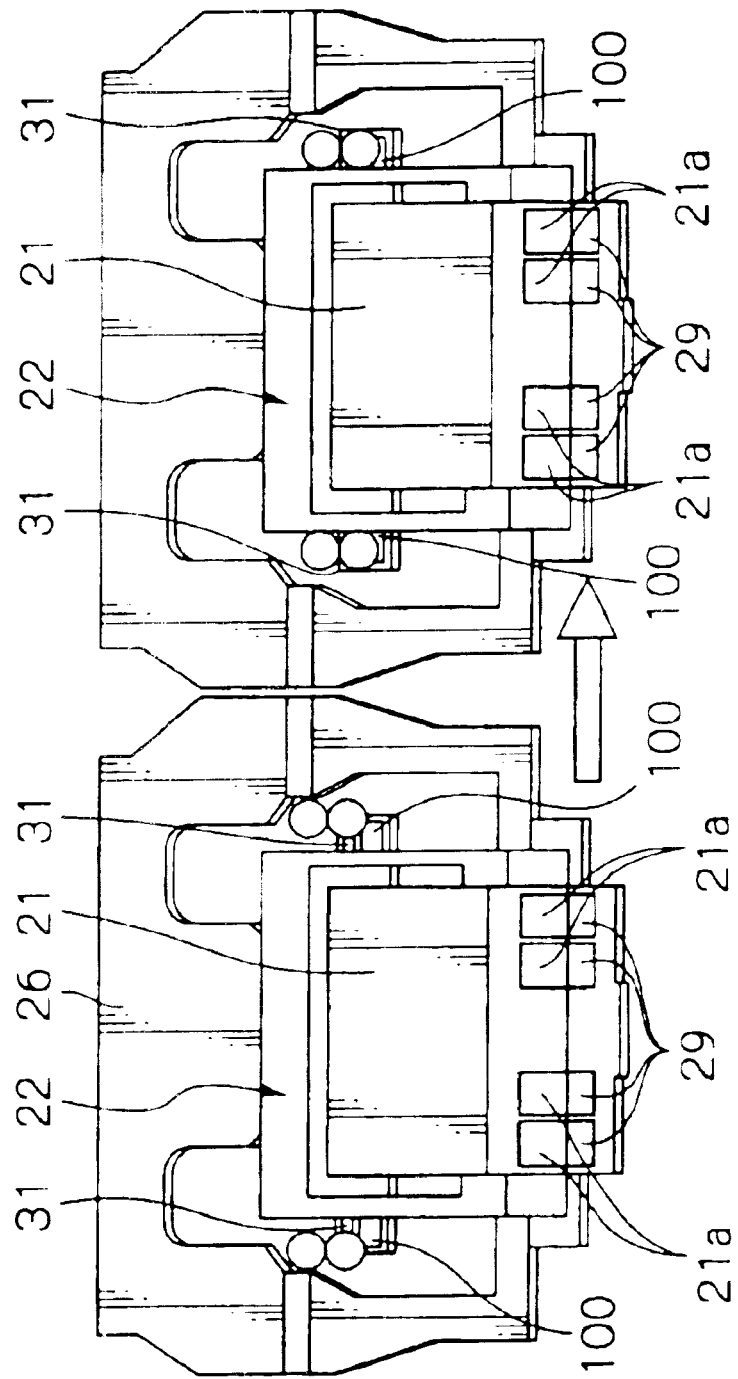
FIGS. 10a and 10b are oblique views illustrating a part of a manufacturing process of the HGA in the embodiment of FIG. 1.

Then, as shown in FIGS. 3 and 10a, the A channel and B channel signal terminals 22b and 22c (FIG. 3) of the actuator 22 are electrically connected with the actuator connection pads 31 by soldering or using silver containing epoxy resin. Also, the ground (common) terminals 22d and 22e (FIG. 3) of the actuator 22 are electrically connected with ground (common) connection pads 100 by soldering or using silver containing epoxy resin. If the soldering is used for the connection, connection strength of the assembly 82 with the suspension will increase.

Figure 10B:
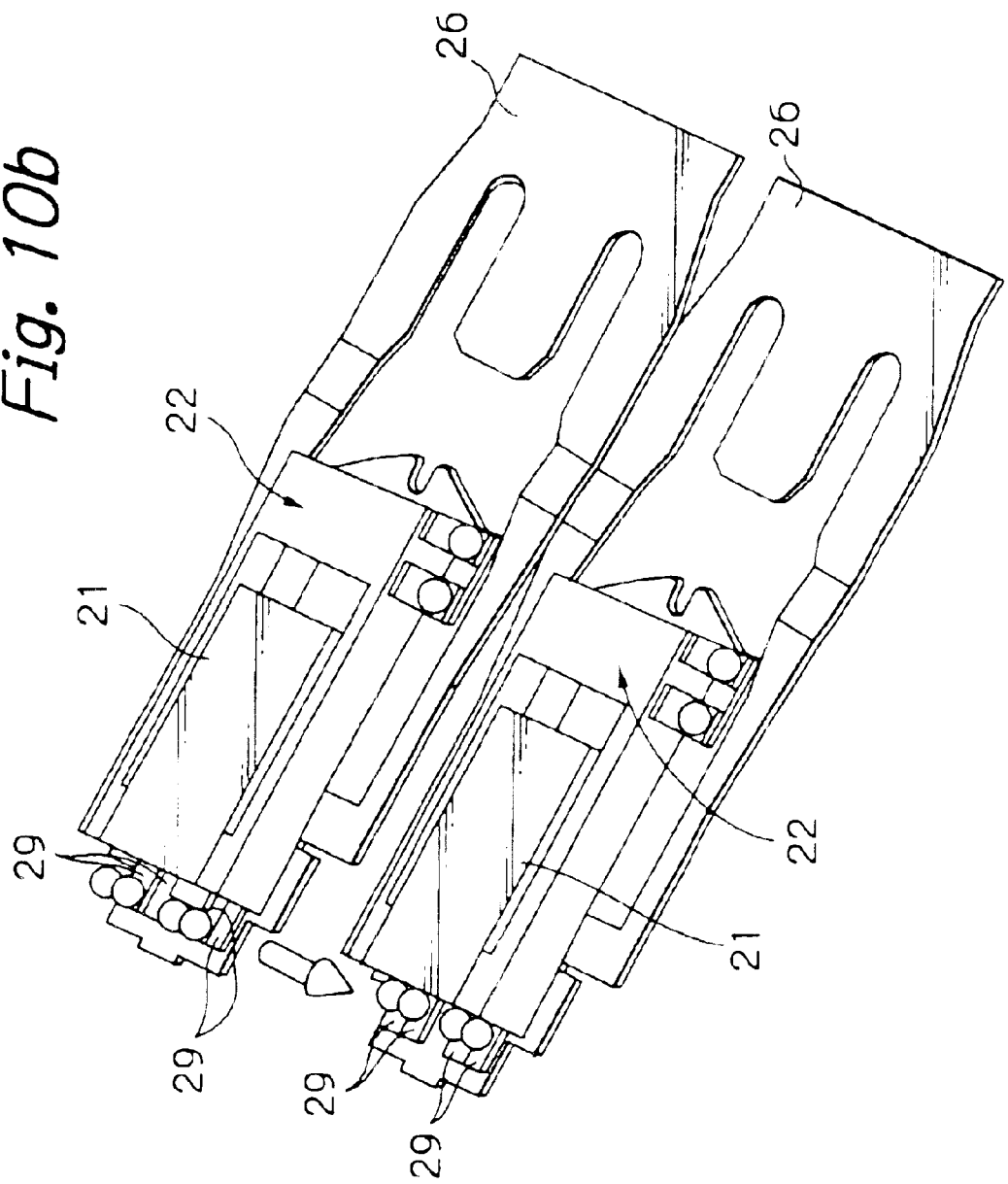

Thereafter, as shown in FIGS. 3 and 10b, the terminals electrodes 21a (FIG. 3) of the magnetic head slider 21 are electrically connected to the head element connection pads 29 by Au ball-bonding for example.

Since the assembly 82 has a simple shape, the above-mentioned processes of adhesion and electrical connection of the assembly 82 with the suspension can be performed by using a general HGA assembling equipment resulting the productivity to extremely improve and thus the manufacturing cost to reduce.

Figure 11:
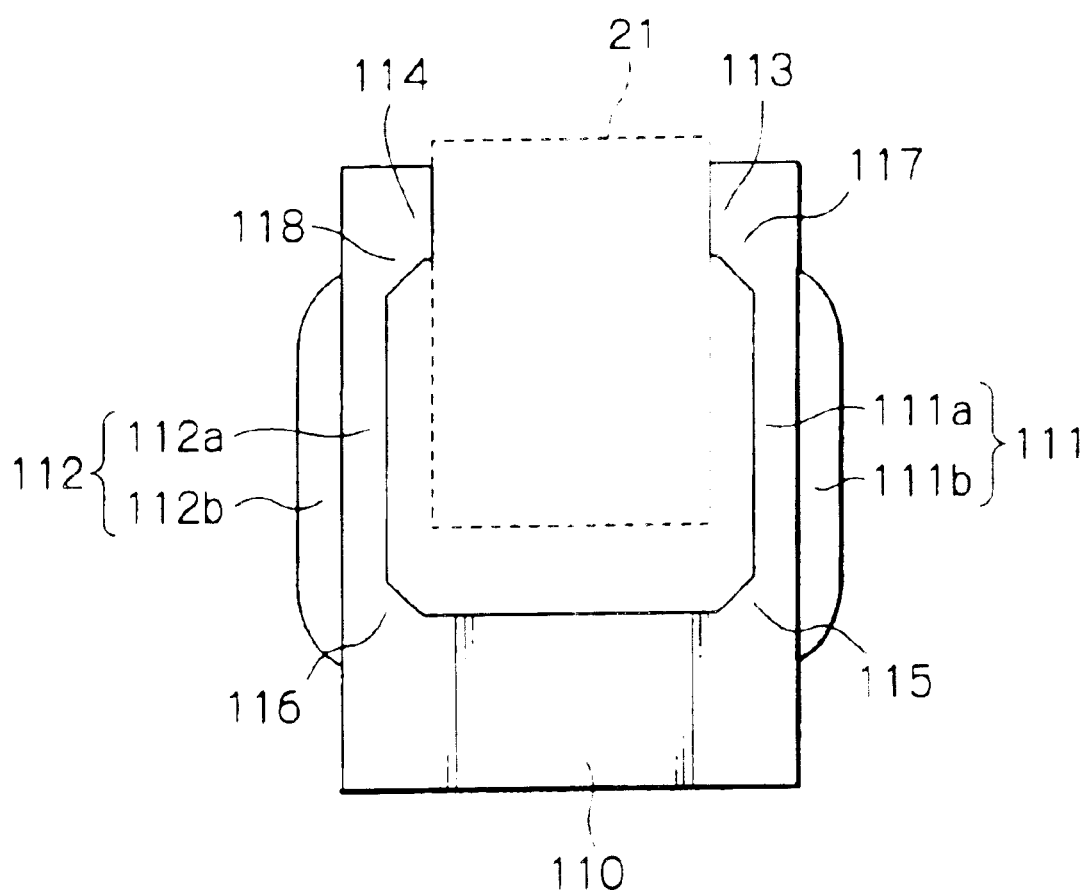
FIG. 11 is an oblique view schematically illustrating a structure of an actuator in another embodiment according to the present invention.

FIG. 11 schematically illustrates a structure of an actuator in another embodiment according to the present invention.

As shown in the figure, this actuator has a rough U-plane shape and consists of a base 110 to be fixed to a suspension and a pair of movable arms 111 and 112 perpendicularly extending from both side ends of the base 110. At top end sections of the movable arms 111 and 112, formed respectively are slider fixing sections 113 and 114 to be fixed to side surfaces of a magnetic head slider 21.

The slider fixing sections 113 and 114 are projected inwardly, namely toward the magnetic head slider 21, so that only these sections 113 and 114 are attached to the side surfaces of the magnetic head slider 21 and that there exists air gaps between the remaining sections of the movable arms 111 and 112 and the side surfaces of the magnetic head slider 21.

The movable arms 111 and 112 consist of arm members 111a and 112a and piezoelectric elements 111b and 112b formed on side surfaces of the arm members 111a and 112a, respectively.

The base 110 and the arm members 111a and 112a of the actuator are united by an elastic sintered ceramic such as $ZrO_2$ for example. Since the main sections of the actuator are made of the elastic sintered ceramic such as $ZrO_2$ that is strong for bending, a shock resistance of the actuator itself increases.

Configurations and operations of the piezoelectric elements 111b and 112b are the same as those in the actuator shown in FIG. 5.

In the embodiment shown in FIG. 11, corner reinforcements 115 to 118 are formed at inner corners at the coupling sections of the movable arms 111 and 112 and the base 110 and at inner corners at the coupling sections of the movable arms 111 and 112 and the slider fixing sections 113 and 114 so that these inner corners have a plane shape with an obtuse angle not a right angle as those of the actuator shown in FIG. 5. The corner reinforcements 115 to 118 are united with the base 110 and the arm members 111a and 112a by the same sintered ceramic. Thus, the shock resistance of the actuator itself is extremely improved.

Other configurations, operations and advantages of this embodiment are the same as those of the embodiment of FIG. 2.

Figure 12:
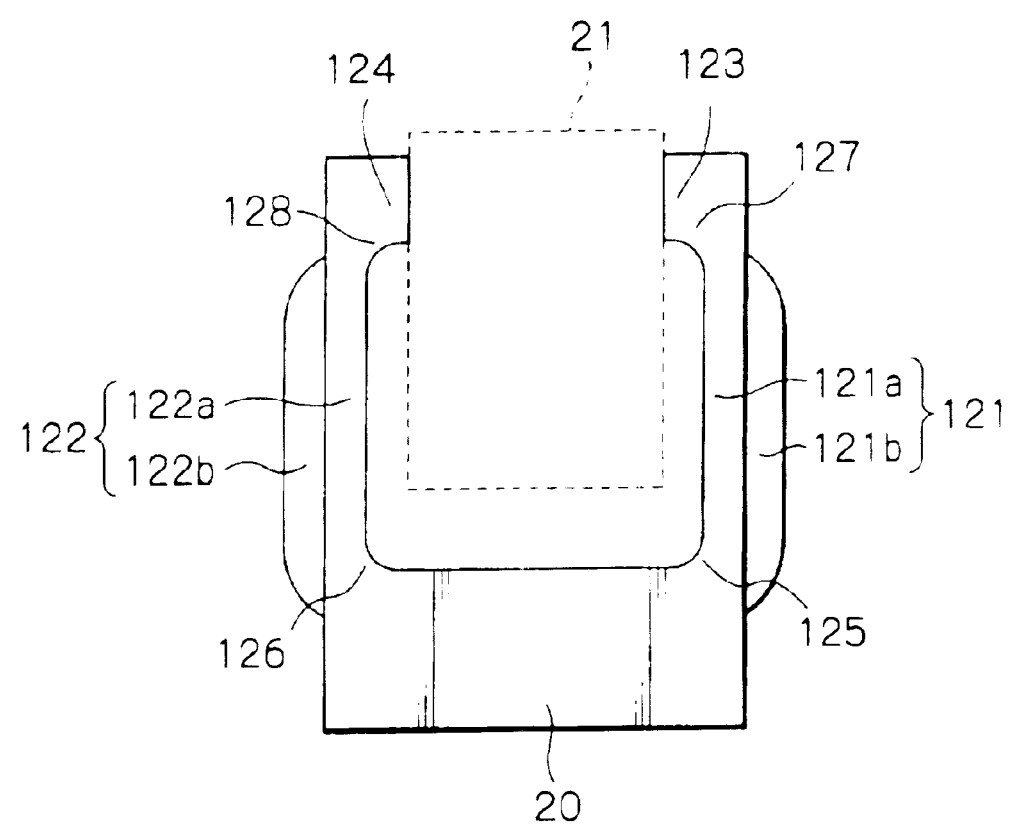
FIG. 12 is an oblique view schematically illustrating a structure of an actuator in a further embodiment according to the present invention.

FIG. 12 schematically illustrates a structure of an actuator in a further embodiment according to the present invention.

As shown in the figure, this actuator has a rough U-plane shape and consists of a base 120 to be fixed to a suspension and a pair of movable arms 121 and 122 perpendicularly extending from both side ends of the base 120. At top end sections of the movable arms 121 and 122, formed respectively are slider fixing sections 123 and 124 to be fixed to side surfaces of a magnetic head slider 21.

The slider fixing sections 123 and 124 are projected inwardly, namely toward the magnetic head slider 21, so that only these sections 123 and 124 are attached to the side surfaces of the magnetic head slider 21 and that there exists air gaps between the remaining sections of the movable arms 121 and 122 and the side surfaces of the magnetic head slider 21.

The movable arms 121 and 122 consist of arm members 121a and 122a and piezoelectric elements 121b and 122b formed on side surfaces of the arm members 121a and 122a, respectively.

The base 120 and the arm members 121a and 122a of the actuator are united by an elastic sintered ceramic such as $ZrO_2$ for example. Since the main sections of the actuator are made of the elastic sintered ceramic such as $ZrO_2$ that is strong for bending, a shock resistance of the actuator itself increases.

Configurations and operations of the piezoelectric elements 121b and 122b are the same as those in the actuator shown in FIG. 5.

In the embodiment shown in FIG. 12, corner reinforcements 125 to 128 are formed at inner corners at the coupling sections of the movable arms 121 and 122 and the base 120 and at inner corners at the coupling sections of the movable arms 121 and 122 and the slider fixing sections 123 and 124 so that these inner corners have a smooth plane shape not a right angle plane shape as those of the actuator shown in FIG. 5. The corner reinforcements 125 to 128 are united with the base 120 and the arm members 121a and 122a by the same sintered ceramic. Thus, the shock resistance of the actuator itself is extremely improved.

Other configurations, operations and advantages of this embodiment are the same as those of the embodiment of FIG. 2.

Figure 13:
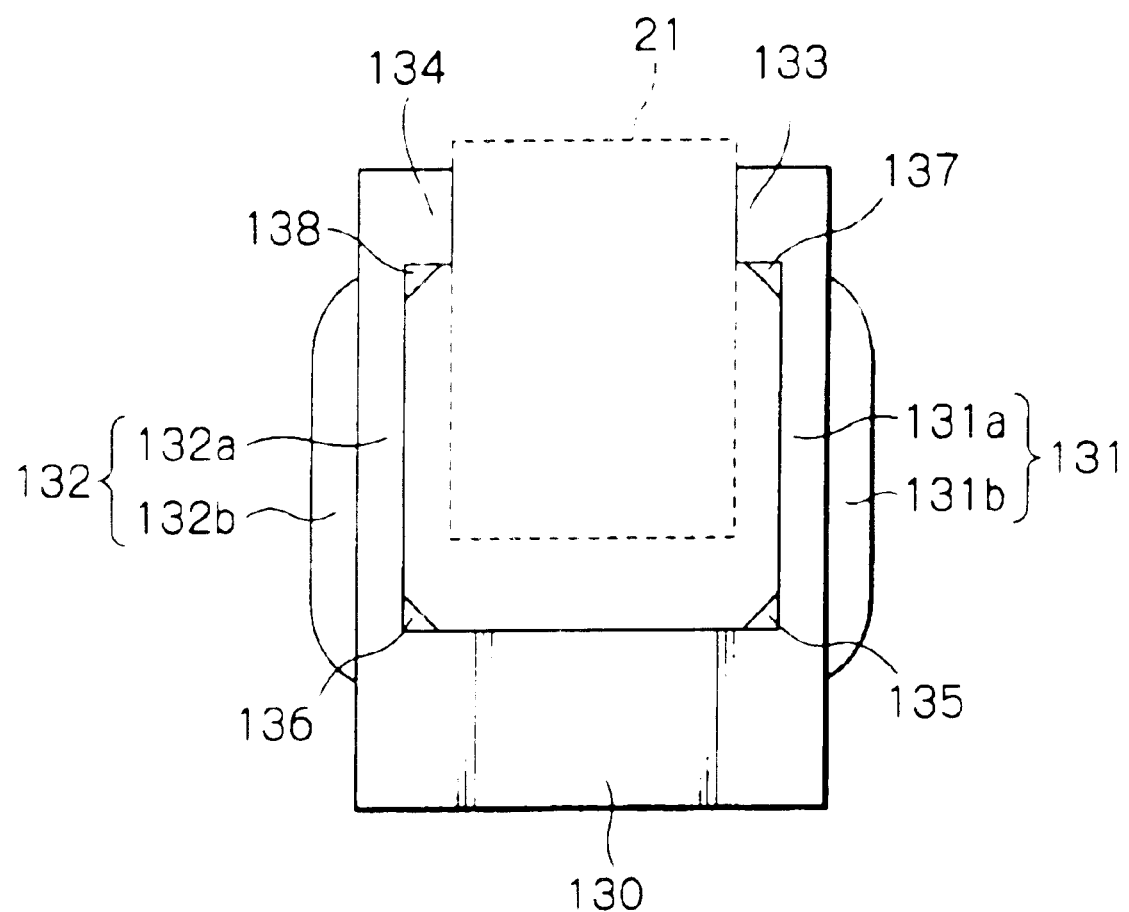
FIG. 13 is an oblique view schematically illustrating a structure of an actuator in a still further embodiment according to the present invention.

FIG. 13 schematically illustrates a structure of an actuator in a still further embodiment according to the present invention.

As shown in the figure, this actuator has a rough U-plane shape and consists of a base 130 to be fixed to a suspension and a pair of movable arms 131 and 132 perpendicularly extending from both side ends of the base 130. At top end sections of the movable arms 131 and 132, formed respectively are slider fixing sections 133 and 134 to be fixed to side surfaces of a magnetic head slider 21.

The slider fixing sections 133 and 134 are projected inwardly, namely toward the magnetic head slider 21, so that only these sections 133 and 134 are attached to the side surfaces of the magnetic head slider 21 and that there exists air gaps between the remaining sections of the movable arms 131 and 132 and the side surfaces of the magnetic head slider 21.

The movable arms 131 and 132 consist of arm members 131a and 132a and piezoelectric elements 131b and 132b formed on side surfaces of the arm member 131a and 132a, respectively.

The base 130 and the arm members 131a and 132a of the actuator are united by an elastic sintered ceramic such as $ZrO_2$ for example. Since the main sections of the actuator are made of the elastic sintered ceramic such as $ZrO_2$ that is strong for bending, a shock resistance of the actuator itself increases.

Configurations and operations of the piezoelectric elements 131b and 132b are the same as those in the actuator shown in FIG. 5.

In the embodiment shown in FIG. 13, corner reinforcements 135 to 138 made of epoxy resin are additionally formed at inner corners at the coupling sections of the movable arms 131 and 132 and the base 130 and at inner corners at the coupling sections of the movable arms 131 and 132 and the slider fixing sections 133 and 134. Thus, the shock resistance of the actuator itself is extremely improved.

Other configurations, operations and advantages of this embodiment are the same as those of the embodiment of FIG. 2.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiment described in the specification, except as defined in the appended claims.

What is claimed is:

1. A precise positioning actuator to be fixed with a head slider with at least one head element and with a support, for precisely positioning said at least one head element, comprising:
   a pair of movable arms capable of displacing in response to a drive signal applied to said actuator, for catching said head slider in a space between said movable arms; and
   a base fixed to said support, said movable arms extending from said base,
   inner corners at coupling sections of said base and said movable arms having an obtuse angle plane shape or a smooth plane shape,
   wherein said base is made of an elastic sintered ceramic.

2. The actuator as claimed in claim 1, wherein said movable arms have at their top end sections slider fixing sections to be fixed to side surfaces of said head slider, respectively.

3. The actuator as claimed in claim 2, wherein said actuator has a shape so that there exists air gaps between said movable arms and side surfaces of said header slider except for said slider fixing sections, respectively.

4. The actuator as claimed in claim 1, wherein said elastic sintered ceramic is $ZrO_2$.

5. The actuator as claimed in claim 1, wherein said movable arms are constituted so that said head slider is linearly and laterally oscillated in response to the drive signal.

6. The actuator as claimed in claim 1, wherein said actuator has an approximately U-plane shape.

7. The actuator as claimed in claim 1, wherein said actuator has a thickness equal to or less than a thickness of a head slider to be caught.

8. The actuator as claimed in claim 1, wherein said at least one head element is at least one thin-film magnetic head element.

9. A precise positioning actuator to be fixed with a head slider with at least one head element and with a support, for precisely positioning said at least one head element, comprising:
   a pair of movable arms capable of displacing in response to a drive signal applied to said actuator, for catching said head slider in a space between said movable arms; and
   a base fixed to said support, said movable arms extending from said base,
   inner corners at coupling sections of said base and said movable arms having an obtuse angle plane shape or a smooth plane shape,
   wherein each of said movable arms comprises an arm member made of an elastic sintered ceramic, and a piezoelectric element formed on a side surface of said arm member.

10. The actuator as claimed in claim 9, wherein said elastic sintered ceramic is $ZrO_2$.

11. A precise positioning actuator to be fixed with a head slider with at least one head element and with a support, for precisely positioning said at least one head element, comprising:
   a pair of movable arms capable of displacing in response to a drive signal applied to said actuator, for catching said head slider in a space between said movable arms; and
   a base fixed to said support, said movable arms extending from said base,
   inner corners at coupling sections of said base and said movable arms having an obtuse angle plane shape or a smooth plane shape,
   wherein a spacing between said pair of movable arms is determined to a value slightly less than a width of said head slider to be caught.

12. A head gimbal assembly including a head slider with at least one head element, a support and a precise positioning actuator fixed with said head slider and with said support for precisely positioning said at least one head element, said actuator comprising a pair of movable arms capable of displacing in response to a drive signal applied thereto and a base fixed to said support, said movable arms extending from said base, said head slider being caught in a space between said movable arms, inner corners at coupling sections of said base and said movable arms having an obtuse angle plane shape or a smooth plane shape,
   wherein said base is made of an elastic sintered ceramic.

13. The head gimbal assembly as claimed in claim 12, wherein said movable arms have at their top end sections slider fixing sections fixed to side surfaces of said head slider, respectively.

14. The head gimbal assembly as claimed in claim 12, wherein said actuator has a shape so that there exists air gaps between said movable arms and side surfaces of said head slider except for said slider fixing sections, respectively.

15. The head gimbal assembly as claimed in claim 12, wherein said elastic sintered ceramic is $ZrO_2$.

16. The head gimbal assembly as claimed in claim 12, wherein said movable arms are constituted so that said bead slider is linearly and laterally oscillated in response to the drive signal.

17. The head gimbal assembly as claimed in claim 12, wherein said actuator has an approximately U-plane shape.

18. The head gimbal assembly as claimed in claim 12, wherein said actuator has a thickness equal to or less than a thickness of said head slider.

19. The head gimbal assembly as claimed in claim 12, wherein said at least one head element is at least one thin-film magnetic head element.

20. The head gimbal assembly as claimed in claim 12, wherein said movable arms of said actuator and said head slider are fixed with an adhesive.

21. The head gimbal assembly as claimed in claim 12, wherein said actuator and said support are fixed with an adhesive and a solder.

22. A head gimbal assembly including a head slider with at least one head element, a support and a precise positioning actuator fixed with said head slider and with said support for precisely positioning said at least one head element, said actuator comprising a pair of movable arms capable of displacing in response to a drive signal applied thereto and a base fixed to said support, said movable arms extending from said base, said head slider being caught in a space between said movable arms, inner corners at coupling sections of said base and said movable arms having an obtuse angle plane shape or a smooth plane shape, wherein each of said movable arms comprises an arm member made of an elastic sintered ceramic, and a piezoelectric element formed on a side surface of said arm member.

23. The head gimbal assembly as claimed in claim 22, wherein said elastic sintered ceramic is $ZrO_2$.

24. A head gimbal assembly including a head slider with at least one head element, a support and a precise positioning actuator fixed with said head slider and with said support for precisely positioning said at least one head element, said actuator comprising a pair of movable arms capable of displacing in response to a drive signal applied thereto and a base fixed to said support, said movable arms extending from said base, said head slider being caught in a space between said movable arms, inner corners at coupling sections of said base and said movable arms having an obtuse angle plane shape or a smooth plane shape, wherein a spacing between said pair of movable arms is determined to a value slightly less than a width of said head slider.

* * * * *